(12) United States Patent
Alter

(10) Patent No.: US 6,720,962 B1
(45) Date of Patent: Apr. 13, 2004

(54) HAIR GENERATION AND OTHER NATURAL PHENOMENA WITH SURFACE DERIVED CONTROL VOLUMES IN COMPUTER GRAPHICS AND ANIMATION

(75) Inventor: Joseph Scott Alter, Los Angeles, CA (US)

(73) Assignee: Joseph Alter Inc., Los Angeles, CA (US)

( * ) Notice: Subject to any disclaimer, the term of this patent is extended or adjusted under 35 U.S.C. 154(b) by 193 days.

(21) Appl. No.: 09/730,325

(22) Filed: Dec. 4, 2000

(51) Int. Cl.[7] .............................................. G06T 17/00
(52) U.S. Cl. ...................................... 345/420; 345/423
(58) Field of Search ................................ 345/420, 424, 345/419, 418, 428, 581

(56) References Cited

U.S. PATENT DOCUMENTS

| 5,448,687 | A | * | 9/1995 | Hoogerhyde et al. | ........ 345/423 |
| 5,732,203 | A | * | 3/1998 | Menegazzi | ................... 345/420 |
| 5,796,411 | A | | 8/1998 | Cyman et al. | |
| 6,037,949 | A | | 3/2000 | DeRose et al. | |
| 6,191,796 | B1 | * | 2/2001 | Tarr | ........................... 345/581 |
| 6,266,062 | B1 | * | 7/2001 | Rivara | ........................ 345/419 |

OTHER PUBLICATIONS

Hoppe, Hugues, "Progressive Meshes," Computer Graphics (SIGGRAPH 96 Conference Proceedings), pp 99–108 (1996).

Eck, Matthias, et al., "Automated Reconstruction of B–Spline Surfaces of Arbitrary Topological Type," Computer Graphics (SIGGRAPH 96 Conference Proceedings), pp. 325–334 (1996).

Halstead, Mark, et al., "Efficient, Fair Interpolation Using Catmull–Clark Surfaces," Computer Graphics (SIGGRAPH 96 Conference Proceedings), pp. 35–44 (1996).

Krishnamurthy, Venkat, et al., "Fitting Smooth Surfaces to Dense Polygon Meshes," Computer Graphics (SIGGRAPH 96 Conference Proceedings), pp. 313–324 (1996).

Hoppe, Hugues et al., "Piecewise Smooth Surface Reconstruction," Computer Graphics (SIGGRAPH 94 Conference Proceedings), pp. 295–302 (1994).

Doo, D., et al., "Behavior of Recursive Divisions Surfaces Near Extraordinary Points," Computer Aided Design, 10:356–360 (1978).

Catmull, E. et al., "Recursively Generated B–Spline Surfaces on Arbitrary Topological Meshes," Computer Aided Design, 10:350–355 (1978).

Lee, Yuencheng, et al., "Realistic Modeling for Facial Animation," Computer Graphics (SIGGRAPH 95 Conference Proceedings), pp. 55–62 (1995).

Certain, Andrew et al., "Interactive Multiresolution Surface Viewing," Computer Graphics (SIGGRAPH 96 Conference Proceedings), pp. 91–98 (1996).

Nasri, A.H., "Boundary–Corner Control in Recursive–Subdivision Surfaces," Computer Aided Design, vol. 2, pp. 405–410 (1990).

(List continued on next page.)

*Primary Examiner*—Mark Zimmerman
*Assistant Examiner*—Huedung X. Cao

(57) ABSTRACT

Methods for defining smooth and continuous coordinate systems in a volume comprised of a lattice structure of guide columns derived from arbitrarily modeled surface topologies involving polygons, nurbs, linear segments, and subdivision surfaces. Applications of these techniques in computer graphics and computer animation include: (1) the definition of pseudo-coordinate systems for use in creating geometry which must grow from said surface (2) the creation of a highly stable coordinate system involving guide columns in which Cartesian physical simulations may be carried out and rendered as well as deformed and rerendered if desired.

10 Claims, 7 Drawing Sheets

OTHER PUBLICATIONS

Nasri, Ahmad, H., Surface Interpolation of Irregular Networks with Normal Conditions, Computer Aided Geometric Design, 8:89–96 (1991).

Nasri, Ahman H., "Polyhedral Subdivision Methods for Fee–From Surfaces," ACM Transactions on Graphics, 6:29–73 (1987).

Ball, A.A. et al., "A Matrix Approach to the Analysis of Recursively Generated B–Spline Surfaces," Computer–Aided Design, 18:437–442 (1986).

Ball, A.A. et al., "An Investigation of Curvature Variations Over Recursively Generalted B–Spine Surfaces," ACM Transactions on Graphics, 9:424–437 (1990).

Ball, A.A., et al., "Conditions for Tangent Plane Continuity Over Recursively Generated B–Spline Surfaces," ACM Transactions on Graphics, 7:83–102 (1988).

Reif, U., "A Unified Approach to Subdivision Algorithms," Department of Mathematics, University of Stuttgart.

Warren, Joe, "Subdivision Methods for Geometric Design," (1994).

Dyn, Nira et al., "Analysis of Asymptotically Equivalent Binary Subdivision Schemes," School of Mathematical Sciences, Tel Aviv University.

Derfel, G., et al., "Generalized Refinement Equations and Subdivisions Processes," Ben–Gurion University and Tel–Aviv University.

Dyn, N., et al., "Subdivision Schemes for Surface Interpolation," Dpartment of Mathematics, Tel Aviv University (1993).

Dyn, N., et al., "Interpolating Subdivision Schemes for the Generation of Curves and Surfaces," Multivariate Interpolation and Approximation, W. Haussmann and K. Jetter, eds. Birkhauser, Verlag, Basel, pp. 91–106 (1990).

Bajaj, Chandrajit, L., et al., "Adaptive Reconstruction of Surfaces and Scalar Fields from Dense Scattered Trivariate Data," Computer Science Technical Report, pp. 1–19, (1995).

Gudukbay, U., et al., "A Spring Force Formulation For Elastically Deformable Models," Computer & Graphics, 21:3:335–346 (May–Jun. 1991) XP004083258.

Gudukbay, U., et al., "Animation of Deformable Models," Computer–Aided Design, 26:12:868–875 (Dec. 1, 1994) XP000500985.

Hahn, Jam,ES K., "Realistic Animation of Rigid Bodies," Computer Graphics (Siggraph '88 Conference Proceedings) 22:4:299–308 (Aug. 1–5, 1988) XP002084382.

Hoppe, Hugues, "View–Dependent Refinement of Progressive Meshes," Computer Graphics (SIGGRAPH 97 Conference Proceedings) pp. 189–198 (Aug. 3–8, 1997) XP002085290.

Sarraga, et al., "Free–Form Surfaces in GMSolid: Goals and Issues," Solid Modeling by Computers From Theory to Applications, M.S. Pickett and J.W. Boyse, editors, Plenum Press, 1984, pp. 187–209.

Sederberg at al., "Free–Form Deformation of Solid Geometric Models," SIGGRAPH '86, ACM, vol. 20, No. 4, 1986, pp. 151–160.

Anjyo, Ken–ichi, et al., "A Simple Method for Extracting the Natural Beauty of Hair," Computer Graphics (SIGGRAPH '92 Chicago, Jul. 26–31), pp. 111–120.

Csuri, C., et al., "Towards an Interactive High Visual Complexity Animation System," Computer Graphics Research Group, The Ohio State University, 1979, pp. 289–297.

Kajiya, James, T., et al., "Rendering Fur With Three Dimensional Textures," Computer Graphics, vol. 23, No. 3, Jul. 1989, pp. 271–278.

* cited by examiner

HAIR GENERATION AND OTHER NATURAL PHENOMENA WITH SURFACE DERIVED CONTROL VOLUMES IN COMPUTER GRAPHICS AND ANIMATION

FIELD OF THE INVENTION

The invention relates generally to the art of computer graphics and more particularly to the modeling and moving of large systems of geometry such as hair and fur which must extend naturally from an arbitrary surface. Such large systems in the natural world share properties with the shape of the underlying surfaces as well as the shape defined by the systems themselves. This invention relates to computer methods that can render and model deformable systems of geometry that have stable dynamics when viewing the object that has been rendered.

BACKGROUND OF THE INVENTION

Modeling and moving extremely large systems of geometry in a stable surfaced based volume has been a central problem in computer graphics and computer animation systems. Hair, in particular, has long presented computer artists with intractable problems when trying to define, shape, and manipulate the millions of geometrical elements which comprise a usual occurrence of hair.

Problems arising from previous methods involve memory management of such large systems of geometry, efficient definition distortion required on a straight line required to create the geometry (like hair), and how to maintain proper orientation of the details of the geometry as it flexes and moves.

Coordinate systems in general are defined by three vectors which represent the pseudo x,y, and z axis respectively and scalars thereof. Most systems of derived matrices comprise only two vectors and an arbitrary "up" vector which is made perpendicular to the first two vectors by a cross product of the first two vectors. When placed in a matrix, the matrix defines a local coordinate system which may also be inverted. This means, that you can multiply a point in Cartesian space by a local matrix to perform local distortions of orientation and scale, and then return the point to Cartesian space by applying the inverse of the matrix to the point. A typical use of a local matrix is a rotation matrix, which is constructed from euler angles for the three axis, then applied to a set of points to orient an object to a local coordinate system. Another common use of a matrix is a perspective matrix. A perspective matrix contains the necessary distortion of Cartesian space to it's projection on a flat viewing plane, usually scaling points close to the plane larger, and ones further away smaller.

PRIOR ART

Hoppe, Hugues, "Progressive Meshes," Computer Graphics (SIGGRAPH) 96 Conference Proceedings), pp. 99–108 (1996).

Eck, Matthias, and Hugues Hoppe, "Automated Reconstruction of B-Spline Surfaces of Arbitrary Topological Type," Computer Graphics (SIGGRAPH 96 Conference Proceedings), pp. 325–334 (1996).

Halstead, Mark, et al. "Efficient, Fair Interpolation Using Catmull-Clark Surfaces," Computer Graphics (SIGGRAPH 93 Conference Proceedings), pp. 35–44 (1993).

Krishnamurthy, Venkat and Marc Levoy, "Fitting Smooth Surfaces to Dense Polygon Meshes," Computer Graphics (SIGGRAPH 96 Conference Proceedings), pp. 313–324 (1996).

Hoppe, Hugues, et al. "Piecewise Smooth Surface Reconstruction," Computer Graphics (SIGGRAPH 94 Conference Proceedings), pp. 295–302 (1994).

Doo, D. and M. Savin, "Behavior of Recursive Division Surfaces Near Extraordinary Points," Computer Aided Design, 10:356–360 (1978).

Catmull, E., and Clark, J., "Recursively Generated B-Spline Surfaces on Arbitrary Topological Meshes," Computer Aided Design, 10:350–355 (1978).

Lee, Yuencheng, et al., "Realistic Modeling for Facial Animation," Computer Graphics (SIGGRAPH 95 Conference Proceedings), pp. 55–62 (1995).

Certain, Andrew, et al., "Interactive Multiresolution Surface Viewing," Computer Graphics (SIGGRAPH 96 Conference Proceedings), pp. 91–98 (1996).

Nasri, A. H., "Boundary-Corner Control in Recursive-Subdivision Surfaces," Computer Aided Design, vol. 2, pp. 405–410 (1990).

Nasri, Ahmad H., "Surface Interpolation of Irregular Networks with Normal Conditions," Computer Aided Geometric Design, 8:89–96 (1991).

Nasri, Ahman H., "Polyhedral Subdivision Methods for Free-Form Surfaces," ACM Transactions on Graphics, 6:29–73 (1987).

Ball, A. A. and D. J. T. Storry, "A Matrix Approach to the Analysis of Recursively Generated B-Spline Surfaces, " Computer-Aided Design, 18:437–442 (1986).

Ball, A. A. and D. J. T. Storry, "An Investigation of Curvature Variations Over Recursively Generated B-Spline Surfaces," ACM Transactions on Graphics, 9:424–437 (1990).

Ball, A. A. and D. J. T. Storry, "Conditions for Tangent Plane Continuity Over Recursively Generated B-Spline Surfaces," ACM Transactions on Graphics, 7:83–102 (1988).

Reif, U., A Unified Approach to Subdivision Algorithms, Department of Mathematics, University of Stuttgart.

Warren, Joe, Subdivision Methods for Geometric Design (1994).

Dyn, Nira and David Levin, "Analysis of Asymptotically Equivalent Binary Subdivision Schemes," School of Mathematical Sciences, Tel-Aviv University.

Derfel, G., N. Dyn, and D. Levin, "Generalized Refinement Equations and Subdivision Processes," Ben-Gurion University and Tel-Aviv University.

Dyn, N., S. Hed, and D. Levin, Subdivision Schemes for Surface Interpolation, Department of Mathematics, Tel Aviv University (1993).

Dyn, N. and D. Levin, "Interpolating Subdivision Schemes for the Generation of Curves and Surfaces," Multivariate Interpolation and Approximation, W. Haussmann and K. Jetter, eds. Birkhauser, Verlag, Basel, pp. 91–106 (1990).

Bajaj, Chandrajit L. et al., "Adaptive Reconstruction of Surfaces and Scalar Fields from Dense Scattered Trivariate Data," Computer Science Technical Report, pp. 1–19 (1995).

Gudukbay, U. et al., "A Spring Force Formulation For Elastically Deformable Models," Computer & Graphics, 21:3:335–346 (May–June 1991) XP004083258.

Gudukbay, U. and Bulent Ozguc, "Animation of Deformable Models," Computer-Aided Design, 26:12:868–875 (Dec. 1, 1994) XP000500985.

Hahn, James K., "Realistic Animation of Rigid Bodies," Computer Graphics (Siggraph '88 Conference Proceedings) 22:4:299–308 (Aug. 1–5, 1988) XP002084382.

Hoppe, Hugues, "View-Dependent Refinement of Progressive Meshes," Computer Graphics (SIGGRAPH 97 Conference Proceedings) pp. 189–198 (Aug. 3–8, 1997) XP002085290.

Sarraga et al., "Free-Form Surfaces in GMSolid: Goals and Issues," Solid Modeling by Computers From Theory to Applications, M. S. Pickett and J. W. Boyse, editors, Plenum Press, 1984, pp. 187–209.

Sederberg et al., *Free-Form Deformation* of Solid Geometric Models," SIGGRAPH '86, ACM, vol. 20, No. 4, 1986, pp. 151–160.

The U.S. Pat. No. 6,037,949 and the U.S. Pat. No. 5,796,400 which are part of the prior art show use of texture mapping and other uses of scaler fields on subdivision surfaces. The methods, while different in the respect that they don't directly relate to dynamic computer generated hair, are relevant in the use of scalar fields and parameters which will be interpolated over a 2 dimensional surface in a 3D world space. Therefore they can be very instructive as to what is considered as skill in the art in terms of defining and computing the value of scaler fields over a set of points on a surface to model or animate. These patents mention and describe these techniques in computer graphics and computer animation as well as appropriate algorithms used by animators by people skilled in the art on a regular basis.

Since this patent application improves on these patents by a method that uses mesh and coordinates, it is similar to the prior art, but different in many respects based on using coordinates that have underconnectivity and using guide columns having the vector coordinates located thereon and deforming the columns and rendering as will be apparent from the description in this application.

SUMMARY OF THE INVENTION

The present invention, by providing a method for defining stable and arbitrary coordinate systems comprised of a system of matrices that shares similarity with an underlying surface, allows for the pragmatic creation of temporary geometry which may be created on demand, deleted from memory, and repeated on demand with very few actual parameters, thus minimizing memory requirements for recalling such a large system of geometry in a piece-wise fashion.

Under such method, only a straight, undeformed version of a single instance of the geometry (a single hair for example), and the coordinate system described above, must be stored to create and render an infinite set of occurrences across the coordinate system, which provides shape in a volumetric way.

Previous methods use the decades old method of bump mapping, or 'Blinn Shading'. Blinn Shading is a method for creating the appearance of bumps on a surface as a shading artifact by 'wobbling' the normal of a surface, which is in-tern used to shade a point on the surface. The normal is 'wobbled' by constructing a coordinate system out of the underlying surface and rotating the normal vector. This provides us with a method by which we may perform certain distortions of the surrounding space by providing an anchor by which we may rotate and scale local to the root of a surrounding volume. For instance, if you were to grow a hair from a surface, you could then rotate it about it's root using the above method. This method solves for coordinate system of transformation at the root of the hair, but does not provide for the rest of the hair as the volume it creates only has similarity with the surface, and does not share any properties with the hair itself.

Another great difficulty in computer graphics simulation of large systems like hair, has been how to move the geometry using physical simulation. This type of arbitrary volume allows us to run conventional physical simulation on chains formed by the columns of this arbitrary lattice structure, thus distorting the very space that the large system of geometry is passed through allowing for a low resolution definition of this very detailed system.

A common way of representing a spatial distortion for a volume is an FFD (free form deformation lattice). FFD's have the limitation of a grid structure in their definition, and are not suitable for this type of deformation since the underlying surface which drives the deformation may not be connected in a grid-like fashion, such as in the case of a polygonal mesh. FFD's have been employed for distorting space extending from a spline patch primative, since patches have a grid like parameterisation, but this method will fail where one patch edge meets another, because there is no continuity across patch edges, FFD methods are extremely difficult to manage. With a coordinate system such as the one here described, by joining primitives at the base of the deformation space in an arbitrary way, we may have surface continuity, thus spatial continuity as this connectivity gets propagated up the lattice.

By using the underlying connectivity of the surface that this lattice is derived from at each segment of each column, the coordinate system gains the property of stable orientation at each level of the lattice structure. This connectivity simply points at the column's neighbor for what is known as an 'up vector' for an orienting matrix. In the case of hair, this system would share properties of both the underlying surface, as well as the hairs which are grown from said surface. The combination of these two gives us a coordinate system which may be derived, or re-derived (in animation) from changes in either the 'hair' or the surface.

Because this connectivity is static, severe motion and 'tangle' may be applied to the columns of this lattice structure without failure, usually caused by a common problem called 'gimbal lock' which usually occurs in simulated motion of chain-like kinematic structures. Gimbal lock problems happen because dynamic chains usually construct their orientation matrices with a static up vector, such as the 'y' axis. Creating a matrix in this fashion requires a cross product with the direction of the chain link. A static up vector like this will tend to produce a 180 degree flip in orientation when the chain faces in the same or nearly the same direction as the up-vector, which can occur frequently in a large system such as hair.

With the coordinate system described here, each link of the chain has it's own up vector based on it's connectivity with it's neighbors. Because of this, the possibility of a chain facing the same direction as it's up-vector is reduced by an enormous factor, and failures to produce a valid orientation matrix are virtually eliminated.

Another problem in computer graphics with large systems such as hair arises from not having coordinate systems which define an entire volume in this fashion and is one of 'styling'. Hair, for instance, has 'curl', and 'kink'. While these types of transformations may be easily described in Cartesian space, carrying them forward into the space of hair is impossible to do in any sort of stable manor without defining a smooth and stable volume of local coordinate systems by which we may derive orientation and anchors for such transformation at any point in the volume. This is particularly problematic when the hair is bending and twisting such as it does in a dynamic simulation, the coordinate system must contain properties of this movement to anchor and orient such transformations locally throughout the system or the curls and kinks will appear to distort as the hair bends. Describing a stable, continuous coordinate system such as we describe solves for this problem and maintains proper shape as the hair bends and twists from an animated dynamic system.

Failure of previous methods is most apparent in highly flexible dynamic systems and limits them to relatively 'stiff' animation which is limited to flexibility with only very few degrees of freedom of motion. This type of coordinate system has no such limitations with respect to motion, flexibility and realistic simulation.

Another by-product of this approach is the ability to produce actual geometry with continuous and stable orientation along it's length, where previous approaches yield undesirable 'twists' and 'flips' because of their use of arbitrary up vectors for orientation.

BRIEF DESCRIPTION OF THE DRAWINGS

APPENDIX 1 includes two videos entitled "Dog" and "Zeke"

DETAILED DESCRIPTION OF AN EXEMPLARY EMBODIMENT

Figure 1:
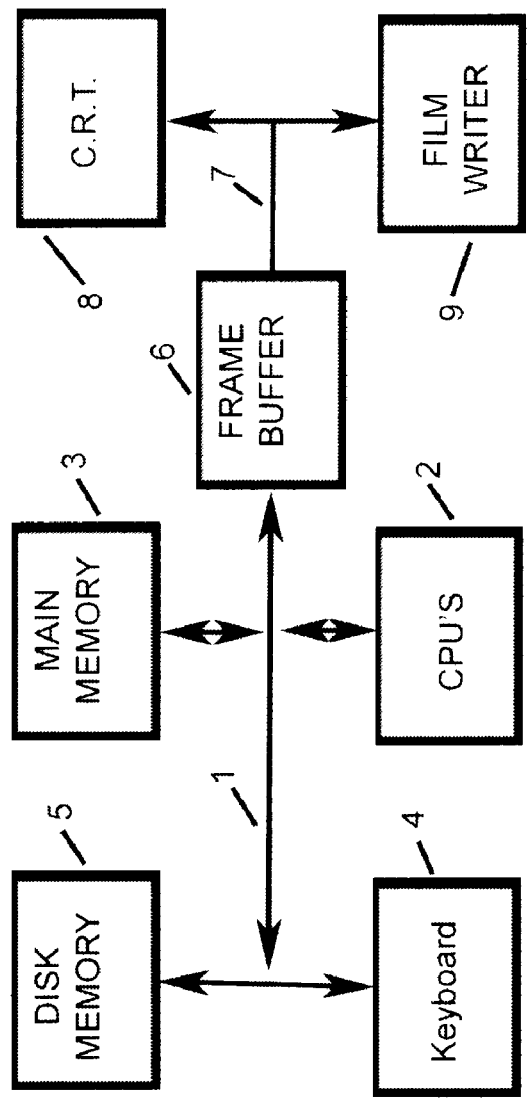
FIG. 1 shows generally the elements of a computer system suitable for carrying out the present invention.

FIG. 1 shows a computer system suitable for carrying out the invention. A main bus 1 is connected to one or more CPU's 2 and a main memory 3. Also connected to the bus are a keyboard 4 and large disk memory 5. The frame buffer 6 receives output information from the main bus and sends it through another bus 7 to either a CRT or another peripheral which writes the image directly onto film. To illustrate the present invention we will describe its use in the animation of a character, Zeke and another character 'Fiasco'—a fluffy dog.

Figure 3:
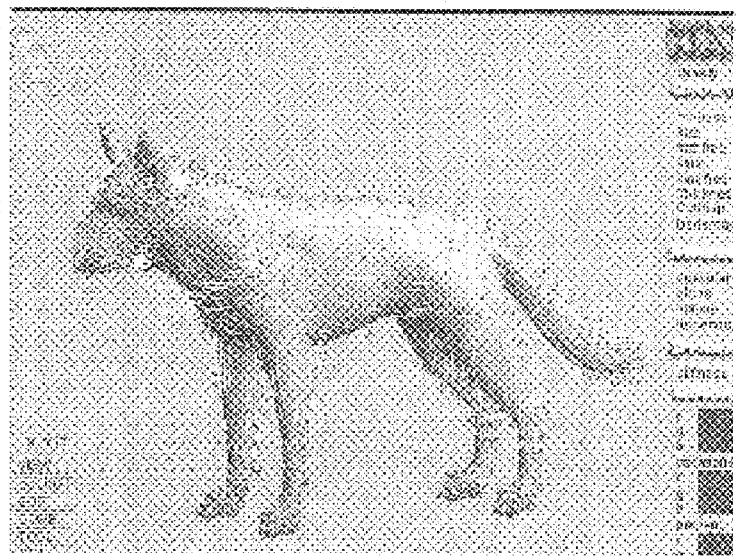
FIG. 3 shows the control point mesh of a dog's body.

The first step involves the production of a 3 dimensional perpendicular lattice by extending linear segments from each vertex of the underlying surface (FIG. 3). This technique can be seen in FIG. 5 where linear segments, 10, in FIG. 5 are extended from the arbitrary surface, 12, to form guide columns, 14. Then, the next step involves connecting each level of each column to it's corresponding neighbors by simply using the underlying surface's connectivity to define it's connection. In an exemplary embodiment, 'Fiasco's' fur, depicted in FIG. 4, the hair rendered contains approximately 5 million geometrical elements whose shape, size, color and material are defined by the control lattice in FIG. 3 and FIG. 5.

Once the set of control points, polygons and creases defining the kinematic surface of 'Fiasco's' body are entered and stored in the computer, the computer animator must determine how each point is to move for each gesture or character movement. This step is done by coding animation controls, which effectuate transformations of the model corresponding to different movements, e.g, left leg forward, left leg backward. There are many means of defining this type of motion, but in 'Fiasco's' case they are provided by simple animated join rotations and interpolations.

Figure 4:
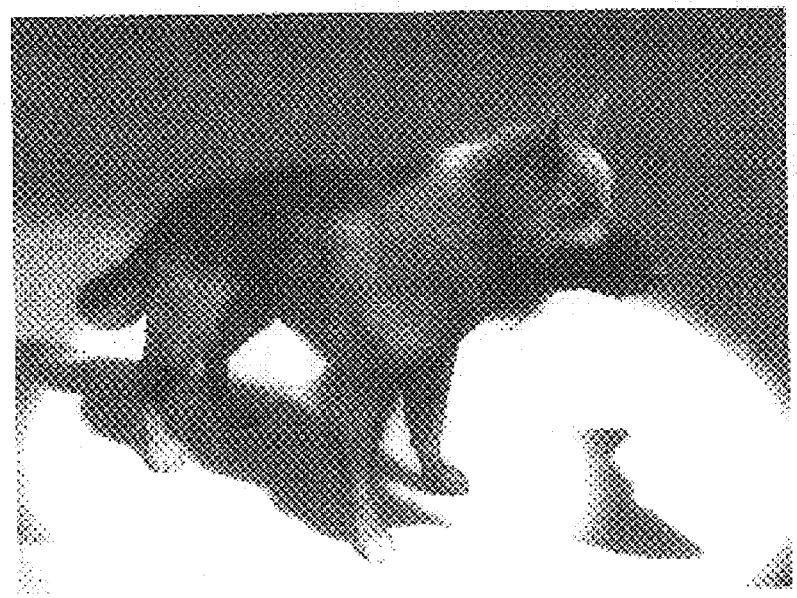
FIG. 4 shows a dog with realistic hair created by the volume.
Figure 5:
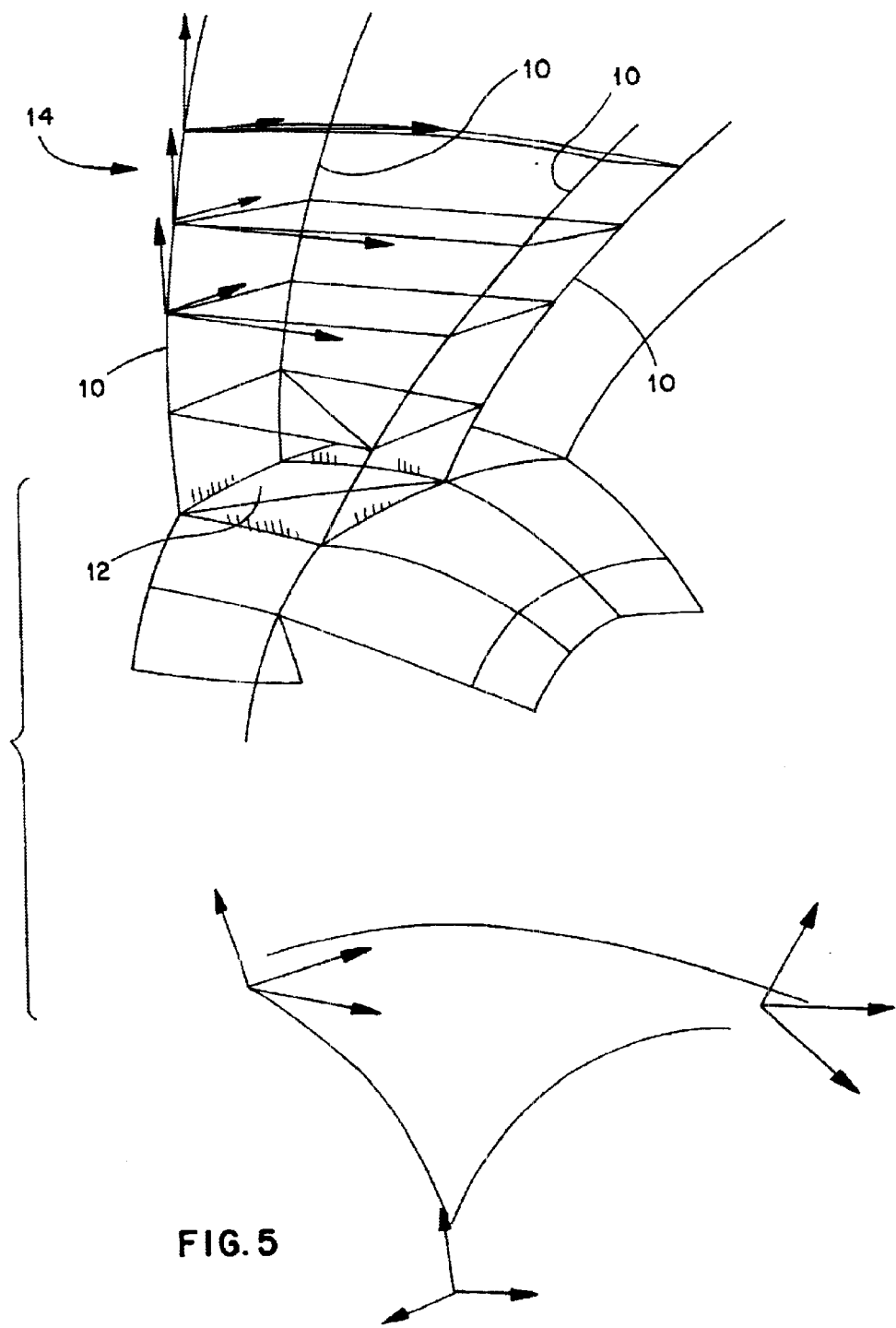
FIG. 5 shows a geometric surface with a column extending from the vertices of the segments of the surface and a schematic of a coordinate system used on said column.

The next step in FIGS. 3 and 4 is the in "motion" creation of a base coordinate system defined by 'Fiasco at rest' with re-orienting the columns, or guide hairs by using the underlying polygons and their normals as a base coordinate system for the column in a deformed state. This is referred to as "deforming the surface geometry arbitrarily" and then multiplying instance geometry throughout the volume using local coordinate systems, as shown in the flow chart of FIG. 2. With the re-oriented coordinate systems with physical simulation, or dynamics, applied to the columns of the coordinate system. A moving simulation as shown in Appendix 1 is attached.

Figure 6:
FIG. 6 shows Zeke with the guide columns applied
Figure 7:
FIG. 7 shows simulated trees created with the method.

The same methods can be applied to a character, 'Zeke', shown in FIG. 6 in Appendix 1 in the video entitled "Zeke", in which the hair is long and flexible. The animation shows how the inventive method shows the stability of said coordinate system in extreme situations in which it is flexed to large degrees of freedom.

These methods may be applied to any type of geometry, for instance, in the case of a single feather is instanced several hundred times over and deformed by the control lattice structure using his method. Also tornadoes have been created with this method by using such coordinate systems that can be used to provide form for animated graphical particle elements.

Defining Control Volume

The control volume, also referred to as coordinate system and lattice, were used at several points in the above described process in order to define smoothly varying parameters on the large system of rendered hair which occupies this volume.

The control volume is defined in the above process, by 'growing' kinematic chains of 15 segments each from the surface normals of each vertex of the underlying model of 'Fiasco's' body, then orienting and 'grooming' these control chains, called 'guide hairs' using interactive sculpting techniques.

The proprietary interface used above, called 'shave and a haircut', allows for defining parameters including color, thickness, kink, frizz, stiffness, and density to each of the guide hairs, which may then be smoothly interpolated across the entire volume.

An interface, also provides a physical simulation to the 'guide hairs' to preview the hair's properties in motion.

Multiplication of Detail

In practice, the bounding volume created by the above procedure allows for the recursive instancing of a single hair, or other geometry, over an entire surface to create infinite detail limited only by visual requirements and computational speed and time limitations.

After a sufficient number of iterations to produce enough hairs, or elements, to be visually satisfactory a system of shading and self shadowing is applied by common buffer or drawing methods well known in the art.

Figure 2:
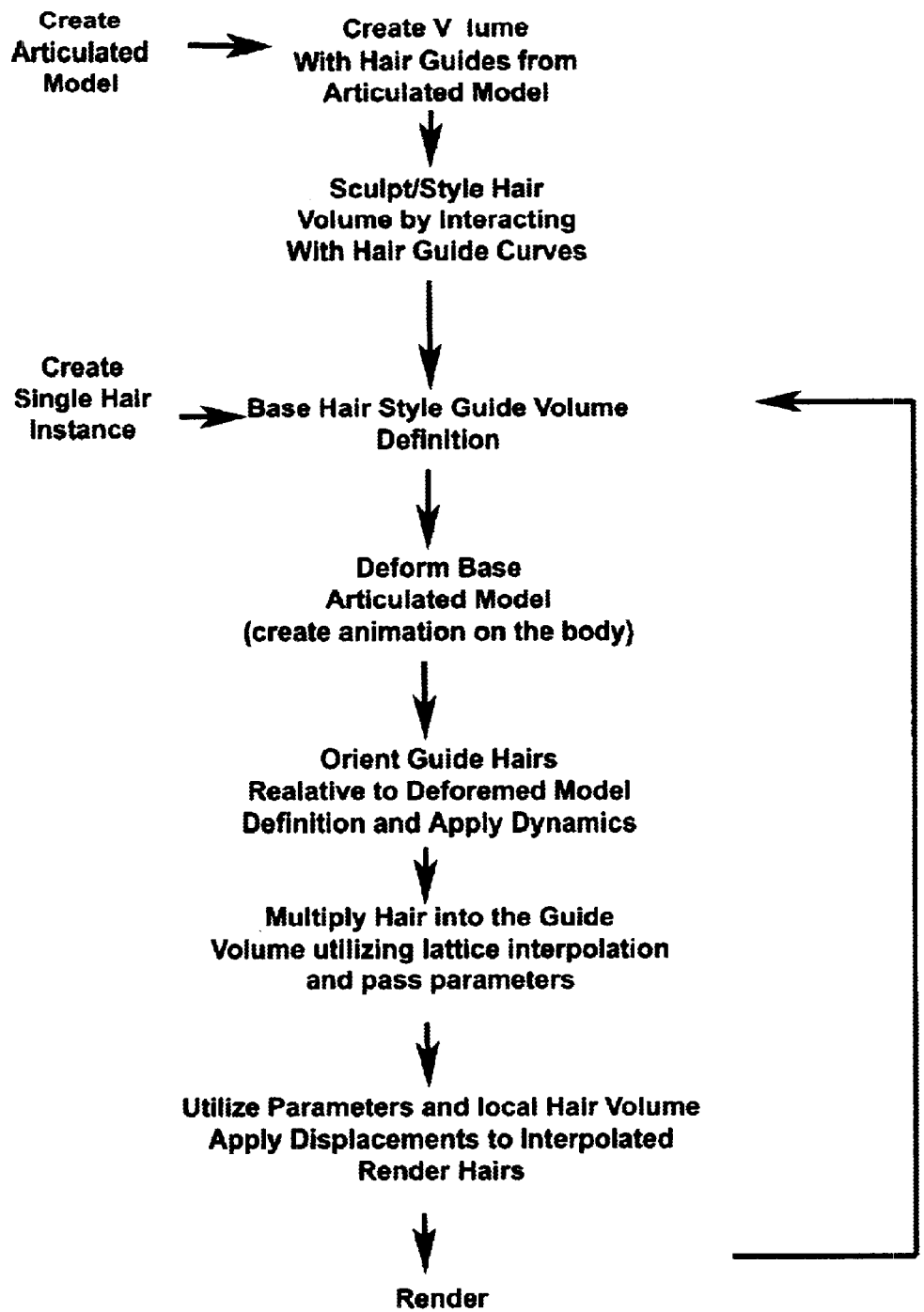
FIG. 2 is a flow chart of the process showing steps to create and cause animated renderhairs whereby their motion is at least partially driven by the motion of the body or skin.

As seen in the flow chart of FIG. 2, and the animations in Appendix 1, it can be seen that we have created through use of the steps of creating a desired model by creating the deformable arbitrary volumes and using the method of creating a mesh that can be of any shape, and creating a coordinate system of underconnectivity with the matrices of the guide columns through the use of defining parameters for interpolation for the guide columns and thereafter deforming the surface geometry and creating matrices for the new volume and thereafter multiplying instance geometry by newly defined matrices and thereafter rendering the new data created. In the process as seen in FIG. 5, the hair is created by creating strands from the data at the new matrices wherein an up arrow is shown as being perpendicular to the hair vectors at each matrix to provide improved dynamic qualities as shown in the animations that have not been attainable until this process.

In reviewing this description, it is clear that by using the steps shown in the flow chart in FIG. 2 as well as explained throughout, this novel method can attain its objectives of not only rendering hair, but also tornadoes, as well as forests of trees, that formerly took millions of dollars of manpower and equipment to produce.

The specific arrangements and methods described herein are merely illustrative of the principles of the present invention. Numerous modifications in form and detail may be made by those of ordinary skill in the art without departing from the scope of the present invention. Although this invention has been shown in relation to particular embodiments, it should not be considered so limited. Rather, the present invention is limited only by the scope of the appended claims.

What is claimed is:

1. An improved method in the fields of computer graphics and animation for defining and maintaining a surfaced referenced control volume for the purposes of creating computer graphic hair and other large geometric systems, comprising the following steps:
    a. selecting an arbitrary three-dimensional geometric graphical surface having a surface topology comprising a set of interconnected surface vertices,
    b. creating a plurality of geometric guide curves, each of said geometric guide curves having a root at one of said surface vertices with one or more segment divisions at regular intervals along said geometric guide curve,
    c. using said surface topology to interconnect said geometric guide curves to form a layered lattice structure, whereby said geometric guide curves form columns of said layered lattice structure, said layered lattice structure having one or more layers at vertices of said segments of said geometric guide curve.

2. A method as defined in claim 1, comprising the additional steps of:
    a. defining a set of rendering parameters to be attached to said guide curves;
    b. creating orientation matrices from junctions formed by said lattice structure from claim 1;
    c. creating a single instance geometry which contains the shape of an undeformed renderhair; and
    d. creating a multiplied instance geometry by multiplying said single instance geometry of said undeformed renderhairs into a volume of said lattice structure using lattice interpolation, whereby said multiplied instance geometry inherits said local matrices and parameters at each vertex as a by product of said lattice interpolation.

3. A method as defined in claim 2, comprising the further step of deforming and moving said guide columns and re-interpolating renderhairs.

4. A method as defined in claim 2, wherein said volume retains a connection with the underlying surface and proper orientation to said surface is maintained by guide curves as the underlying surface is manipulated and moved.

5. A computer implemented method as defined in claim 1, wherein said topology of said arbitrary three-dimensional geometric graphical surface represents contours of a body and wherein hair or fur of said body is represented by said guide columns.

6. A computer implemented method, as defined in claim 2, wherein the properties of said hair can be varied.

7. A computer implemented method, as defined in claim 2, wherein said hair and said geometrical surfaces having hair extending therefrom can be animated.

8. A computer implemented method as defined in claim 2, comprising the additional step of utilizing interpolated property parameters and orientations to perform additional naturalistic displacements.

9. A computer implemented method as defined in claim 8, wherein said naturalistic displacements are known as 'kink', 'frizz', and or 'clumping'.

10. A computer implemented method as defined in claim 1 for creating a control volume composed of a plurality of guide curves, then using said volume to control the paths of particulate matter including dust, smoke and or other debris.

* * * * *